US012089525B2

(12) United States Patent
 Sandoval et al.

(10) Patent No.: US 12,089,525 B2
(45) Date of Patent: Sep. 17, 2024

(54) METHOD AND APPARATUS FOR PROVIDING OPENINGS IN PLASTIC COVER OVER PLANTING BEDS

(71) Applicants: Anthony Sandoval, Royal Oaks, CA (US); Hector Camacho, Royal Oaks, CA (US)

(72) Inventors: Anthony Sandoval, Royal Oaks, CA (US); Hector Camacho, Royal Oaks, CA (US)

( * ) Notice: Subject to any disclaimer, the term of this patent is extended or adjusted under 35 U.S.C. 154(b) by 778 days.

(21) Appl. No.: 17/231,305

(22) Filed: Apr. 15, 2021

(65) Prior Publication Data

US 2022/0330473 A1 Oct. 20, 2022

(51) Int. Cl.
 *A01C 5/04* (2006.01)
 *A01G 13/02* (2006.01)

(52) U.S. Cl.
 CPC ............ *A01C 5/04* (2013.01); *A01G 13/0287* (2013.01)

(58) Field of Classification Search
 CPC ........ A01C 5/04; A01C 5/00; A01G 13/0287; A01G 13/0256; A01G 13/02; A01G 13/00; A01G 11/00
 See application file for complete search history.

(56) References Cited

U.S. PATENT DOCUMENTS

2012/0210643 A1* 8/2012 Linck ..................... A01G 11/00
47/1.01 F

\* cited by examiner

*Primary Examiner* — Christopher J. Novosad
(74) *Attorney, Agent, or Firm* — Donald R. Boys; Central Coast Patent Agengy LLC

(57) ABSTRACT

An apparatus for making holes in plastic along a ridge row has a frame with wheels spanning a ridge row, a furrow reference wheel centered in the frame adapted to roll on soil surface between two raised ridge rows, a first vertically translatable mechanism positioned at a distance to a first side of the furrow reference wheel to be directly over the ridge row adjacent the furrow reference wheel, the vertically translatable mechanism having a first electrically-heated hole punch element at a lower extremity, and a control system having a power supply, sensors and actuators for managing operation of the apparatus. As the apparatus is towed, the furrow reference wheel triggers signals to the control system to activate the vertically translatable mechanism at repeated intervals to descend and make holes in the plastic covering on the raised ridge row.

20 Claims, 2 Drawing Sheets

METHOD AND APPARATUS FOR PROVIDING OPENINGS IN PLASTIC COVER OVER PLANTING BEDS

BACKGROUND OF THE INVENTION

1. Field of the Invention

The present invention is in the technical area of agricultural equipment and pertains more particularly to a machine to make openings in plastic covers over planting regions.

2. Description of Related Art

Planting procedures for produce such as strawberries, for example, involves making long raised ridges in soil, covering the ridges with plastic covering, and making openings, exposing small regions of soil, where individual roots may be planted. The plastic suppresses weed growth and causes water from rain or sprinkler systems to gather in valleys between ridges, rather than to break down the ridges, In a conventional process a tractor with tool that has a wheel with locating spikes produces pin holes on beds and marks where openings need to be implemented for planting roots along the ridge. A second field worker follows the first with a gas torch and uses the gas torch to burn openings through the plastic cover at the points measured and marked by the first worker. In some circumstances the same field worker may measure and mark, and then pass through again with the torch to burn the openings.

The conventional process is labor intensive, the gas torch has unhealthy effluent, and the burning of the plastic further emits unhealthy fumes. Long hours of using the heavy torch causes extreme arm fatigue and soreness/pain. What is clearly needed is an apparatus that may be pulled by a tractor, or that may be self-propelled, the apparatus enabled to make properly spaced opening for planting as the apparatus traverses one or more plastic covered ridges.

BRIEF SUMMARY OF THE INVENTION

In an embodiment of the invention an apparatus for making holes in a plastic covering over a planting bed is provided, comprising a framework having a center section with a hitch connector enabling the framework to be pulled by a tractor, two outboard wing sections coupled to each end of the center section, a sliding unit mounted to each section that each mount carriages extending in the direction of operation, each carriage mounted pivotally to the sliding unit, an operating unit at an end of each carriage, the operating unit supported by a pair of wheels, with the operating unit mounted to the end of the carriage by a swivel allowing limited rotation horizontally, a burner element mounted by an insulator element in each operating unit in a vertical guide operated by a pressure cylinder such that the burner element is raised and lowered by operating the cylinder the cylinder to contact the plastic covering over the planting bed and burn a hole, a power source supported by the framework, providing electrical power, a control system having a central processing unit (CPU), a display, digital storage and inputs enabling a user to set certain variables, such as distance between holes, the control system coupled by control lines to actuators providing movement of elements of the apparatus, and a furrow reference wheel contacting the soil surface in operation, the furrow reference wheel having actuators signaling the control system for distance traveled. In operation with the apparatus towed over a planting bed at least partially covered with plastic sheeting, the burner elements in the operating units make holes linearly along a plurality of rows in the plastic sheeting at preset linear intervals.

In one embodiment the outboard sections are each coupled by pivot mechanisms operated by pressure cylinders that, activated, raise the outboard sections to narrow the apparatus for travel or storage. Also, in one embodiment the center section of the framework is carried on wheels mounted to arms coupled pivotally to the center section, wherein the arms locked in place carry the apparatus for transportation and storage. In one embodiment each burner element is formed to make a hole of a specific size and shape, and the burner elements are manually replaceable in the insulators.

In one embodiment of the invention the sliding units are driven by hydraulic or electric actuators to reposition horizontally along the width of each framework section. Also, in one embodiment the power source is a rechargeable battery with a charging port. In one embodiment the power source comprises an electric generator driven by an internal combustion engine. In one embodiment the apparatus further comprises a clamp manually movable on each of the framework sections to align a center position for the sliding units. In one embodiment the apparatus further comprises a source of compressed gas connected to pressure cylinders through remotely operable valves by which the cylinders are activated to extend and retract. And in one embodiment the apparatus further comprises a hydraulic pump and pressure tank connected to pressure cylinders through remotely operable valves by which the cylinders are activated to extend and retract.

In another aspect of the invention a method for making holes in a plastic covering over a planting bed is provided, comprising towing an apparatus having a framework with a center section on wheels and two outboard sections on opposite sides coupled to the center section, by a hitch connector by tractor over a planting bed at least partially covered with plastic sheeting, trailing a plurality of carriages extending in the direction of travel and mounted by vertical pivots to the sliding units, the carriages each having an operating unit with supporting wheels at an end away from the framework mounted by a swivel allowing limited rotation horizontally, the operating units also each comprising vertical guides translated by pressure cylinders, the vertical guides each having an insulator and an electrically heated burner element adapted to make holes on contact with the plastic sheeting, and measuring linear translation along the planting bed by a furrow reference wheel mounted to the center frame, the furrow reference wheel sending distance measured to a control system programmed to trigger the pressure cylinders translating the vertical guides to extend the burner elements to contact the plastic sheeting and burn holes.

In one embodiment of the method outboard sections are each coupled by pivot mechanisms operated by pressure cylinders that, activated, raise the outboard sections to narrow the apparatus for travel or storage, comprising activating the pressure cylinders, raising the outboard sections. Also, in one embodiment the center section of the framework is carried on wheels mounted to arms coupled pivotally to the center section, comprising lowering the arms to support the apparatus on the wheels mounted to the arms with the outboard sections raised. In one embodiment each burner element is formed to make a hole of a specific size and shape, and the burner elements are manually replaceable in the insulators, comprising selecting burner elements of a specific size and shape for a particular planting bed, and mounting the selected burner elements to the insulators. And in one embodiment the sliding units are driven by hydraulic actuators to reposition horizontally along the width of each framework section, comprising triggering the hydraulic actuators by the control system to move the sliding units to positions programmed into the control system.

In one embodiment of the method the apparatus has a battery power source for powering the burner elements, further comprising powering the burner elements by the battery in burning holes in the plastic sheeting covering the planting bed. Also, in one embodiment the apparatus has an electrical generator driven by an internal combustion engine for powering the burner elements, further comprising powering the burner elements by the generator in burning holes in the plastic sheeting covering the planting bed. In one embodiment the apparatus has a clamp apparatus manually movable on each of the framework sections to align a center position for the sliding units, further comprising setting the clamp to align the center positions. In one embodiment the apparatus has a source of compressed gas connected to pressure cylinders through remotely operable valves by which the cylinders are activated to extend and retract, further comprising activating the pressure cylinders to operate from the source of compressed gas. And in one embodiment the apparatus has a source of hydraulic fluid under pressure connected to pressure cylinders through remotely operable valves by which the cylinders are activated to extend and retract, further comprising activating the pressure cylinders to operate from the source of hydraulic fluid.

DETAILED DESCRIPTION OF THE INVENTION

Figure 1:
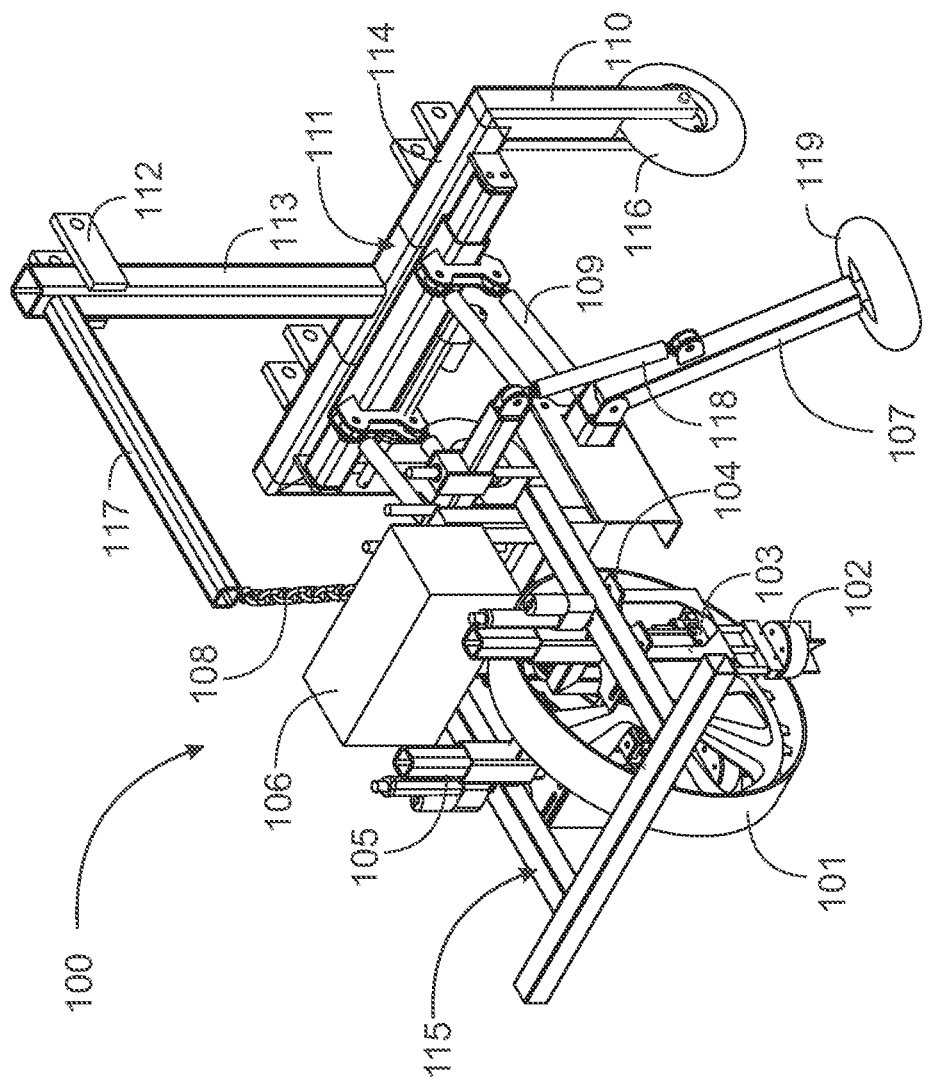
FIG. 1 is a perspective view of an apparatus that measures and makes openings at predetermined intervals in a plastic covering in an embodiment of the invention.

FIG. 1 is a perspective view of an apparatus 100 that may be pulled by a tractor and measures and makes openings at predetermined intervals in a plastic covering over a soil bed as the apparatus is pulled along by the tractor. In use apparatus 100 may be coupled to a hitch on a tractor by a bracket 112 using, for example, a pin retained by clips through the holes that show in the bracket. The apparatus is towed in the direction of the arrow in this example.

An important purpose in making openings in a plastic covering by an apparatus according to an embodiment of the invention is to expose small patches of earth under the plastic covering where plant seedlings, or in some circumstances seeds may be placed in the earth to grow and produce. An example is in the planting of strawberry seedlings. It is well known in the art that a field is typically formed into long raised bed rows and the ridge rows are covered with plastic sheeting before seedlings are planted. In the conventional manner a field worker walks along the ridge row with a gas-powered burner and measures spacing along the row and uses a wand with a flame heated implement on an end to burn openings into the plastic sheeting covering the ridge row. In many embodiments however, there may be no raised rows, or rows may be elevated differently than for strawberry planting.

Returning to FIG. 1 bracket 112 is attached to an upright 113 made in this example of square steel tube stock. Upright 113 is welded at a right angle in this example to a cross brace 114 also made of square steel tube stock. Cross brace 114 in this example is a telescoping element enabling wheels 116 mounted on short axles on outboard uprights 110 to be spaced apart by different dimensions according to spacing of raised ridge rows in a field. The spacing may be set so that each wheel runs in the center of a region between rows.

Operational mechanisms described below are mounted on a following carriage frame 115, which is coupled to a forward frame 111, comprising upright 113, cross brace 114, uprights 110 and wheels 116, by a cantilevered coupling 109 that allows frame 115 and associated components to move up or down a limited degree relative to the forward frame.

Following frame 115 has a furrow reference wheel 101 mounted on an axle to frame 115. The furrow reference wheel in some embodiments has outer cleats (not shown) such that the wheel does not slip relative to the soil bed. The furrow reference wheel has actuators interfacing with sensors that communicate with a control system 106 that has electrical components, power and actuators that may be triggered to operate mechanisms to make openings in the plastic sheeting over rows. There are in this example two-hole punch mechanisms 102 that, in one embodiment, are electrically heated elements that melt an opening through the plastic sheet on contact. The hole punch mechanisms are mounted on adjustable linkages 103 such that the length of a downward stroke may be adjusted by an adjustment apparatus 105, the depth depending at last in part on a height of the rows above the surface that wheel 101 traverses.

Linkages 103 may be triggered to descend at measured intervals to make a hole, and the spacing between holes is adjustable by a spacing apparatus 104. Outboard arms 107 with wheels 119 help maintain alignment with the soil bed in operation. The outboard arms may be raised and deployed by cylinders 118.

In this example apparatus 100 spans two rows, wheel 101 runs between the two rows, and the apparatus, towed by a tractor, makes holes in the plastic covering along both rows as the apparatus is towed. When not needed to operate, the following frame 115 may be lifted by a chain 108 attached to a boom 117, and outboard wheels 119 may be raised, so that wheels 119 and wheel 101 do not make contact, and apparatus 100 may be towed to another field or to a storage facility.

In alternative embodiments apparatus 100 may be a self-powered and propelled unit that need not be towed. In this alternative form there may be an engine, either electric of gas-powered for motive power, a steering apparatus, and a seat and control mechanisms manually operable by a driver.

In other alternative forms an apparatus in an embodiment of this invention may have wider framework, more than one furrow reference wheel, and may span three or more rows, being capable of implementing spaced holes in plastic covering on all the rows spanned.

Figure 2:
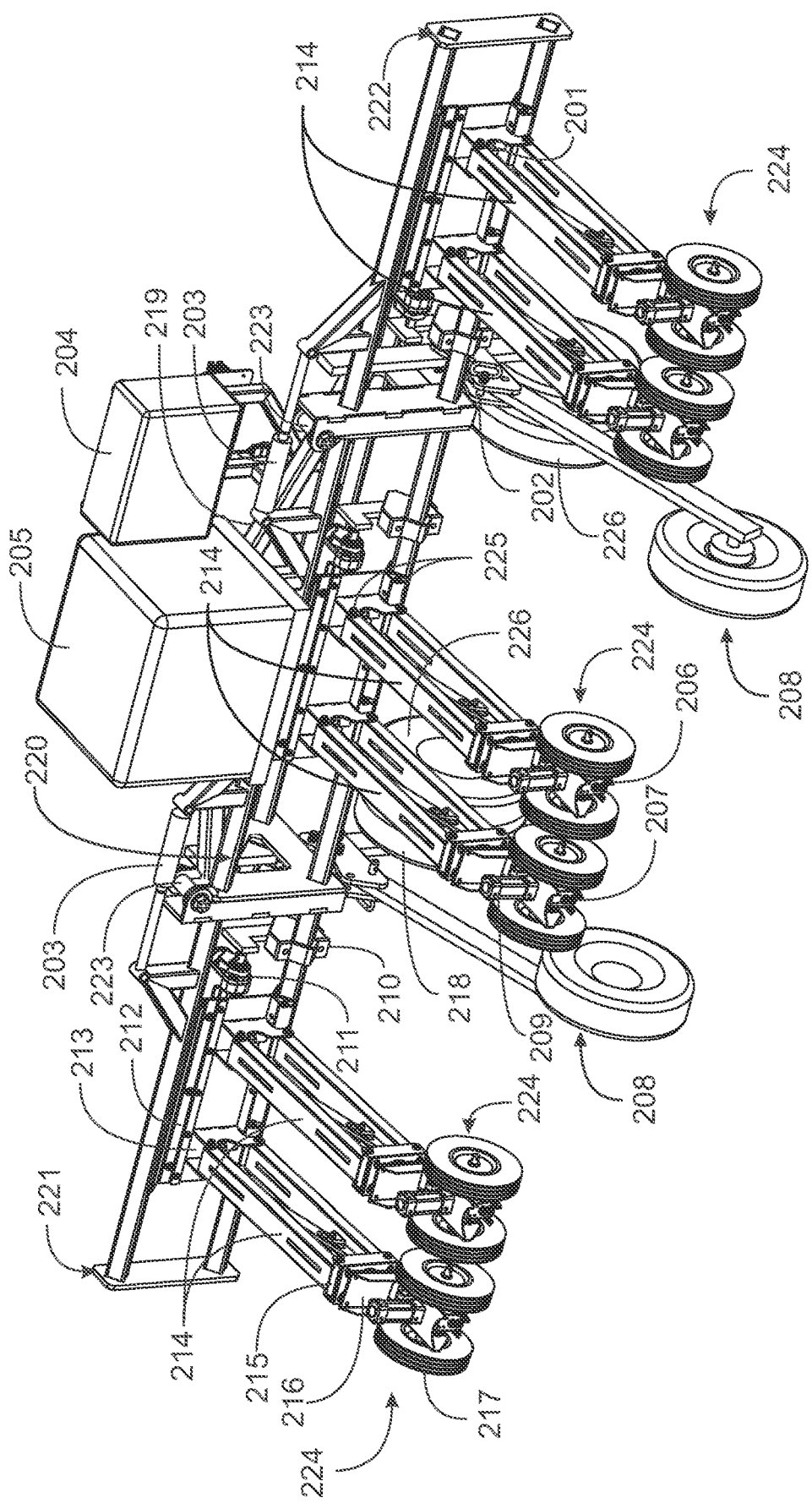
FIG. 2 is a perspective view of an apparatus that measures and makes openings at predetermined intervals in a plastic covering in another embodiment of the invention.

FIG. 2 is a perspective view of an apparatus that makes openings at predetermined intervals in a plastic covering over elevated ridges in an alternative embodiment of the invention. Many of the operative features of the apparatus of FIG. 2 are the same or similar to the features of the apparatus of FIG. 1.

The apparatus in the embodiment shown in FIG. 2 is based on a framework that has three sections. A center section 220 has a hitch connector for towing by a tractor and carries an electrical power source 205, which may be a rechargeable battery in some embodiments of the invention or may in other embodiments be a generator driven by an internal combustion engine. Power source 205 provides power to a control system 204 that in one embodiment has a display screen, a central processing unit (CPU) and digital storage. The control system controls spacing of holes to be made at regular intervals in plastic covering over a soil bed.

In an embodiment that has a CPU, a display, digital memory, and input apparatus a user may set variables such as number of rows, spacing between holes, temperature of burner element, extension of apparatus to burn holes, and other variables in some embodiments.

The framework with center section 220 has outboard sections 221 and 222 on opposite sides, that aligned with the center section as shown extend the overall width of the apparatus, providing an ability to simultaneously burn holes in plastic covering over a plurality of rows in the soil bed. Outboard sections 221 and 222 are connected to center section 220 at pivot shafts 223, and the outboard units may each be raised by cylinders 203 that may be either pneumatic or hydraulic to significantly reduce the overall width of the apparatus during transport or storage. High pressure air or hydraulic fluid sources are not shown but may be assumed to be present. The three-unit frame is supported for transport or storage on wheels assemblies 208 that are pinned to the frame by pins 202 that may be removed to raise the wheel assemblies to allow for field operation. With assemblies 208 raised the apparatus is supported on two wheels 226 that rotate on axles in the framework.

The center frame section and both of the outboard sections each mount a sliding unit 212 that holds carriages 214 extending in the direction of operation. Each of carriages 214 is pivoted vertically at pivot points 225, although element numbers are only shown for one carriage. This pivoting arrangement allows the operating opposite end of each carriage to follow the soil surface faithfully. Sliding units 212 may be translated left and right on the frame sections by hydraulic or electric actuators 211 to center on bed locations. A clamp apparatus 210 may be manually moved and set on each of the framework sections to align a center position for sliding units 212.

Each carriage 214 has at an end away from the framework an operating unit 224 that rolls on a set 217 of wheels. The operating unit comprises an insulated holder 207 that holds a heating element 206 that is heated and moved upward and downward by a cylinder 209 to make contact with plastic and burn a hole in the plastic. Heating element 206 may be removed and replaced at need to provide a hole shape and diameter desired. Operating unit 224 at the end of carriage 214 is mounted to end 215 of carriage 214 by a swivel 216 to allow for bed top angle change. This unit is guided by wheels 217 to keep burning element 206 parallel to the bed top surface.

In operation a furrow reference wheel 218 is mounted on an axle to the framework. The furrow reference wheel in some embodiments has outer cleats (not shown) such that the wheel does not slip relative to the soil bed. The furrow reference wheel has actuators interfacing with sensors that communicate with control system 204 providing distance traveled, such that the control system may actuate cylinders 209 to make holes at the intervals set in the control system.

Overall, apparatus in embodiments of this invention may provide automated hole production in plastic sheeting covering soil beds, eliminating need for manual measurement and manual hole production. Burner elements 206 may be selected according to hole diameter and shape desired. Operating units 224 may be spaced as desired by moving sliding elements 212.

A person skilled in the art will understand that all of the embodiments presented and described above are entirely exemplary and are not limiting to the scope of the invention. There are many alterations and variations that may be made without departing from the scope of the invention. The invention is limited only by the claims.

The invention claimed is:

1. An apparatus for making holes in a plastic covering over a planting bed, comprising:
 a framework having a center section with a hitch connector enabling the framework to be pulled by a tractor;
 two outboard wing sections coupled to each end of the center section;
 a sliding unit mounted to each section that each mount carriages extending in a direction of operation, each carriage mounted pivotally to the sliding unit;
 an operating unit at an end of each carriage, the operating unit supported by a pair of wheels, with the operating unit mounted to the end of the carriage by a swivel allowing limited rotation horizontally;
 a burner element mounted by an insulator element in each operating unit in a vertical guide operated by a pressure cylinder such that the burner element is raised and lowered by operating the cylinder to contact the plastic covering over the planting bed and burn a hole;
 a power source supported by the framework, providing electrical power;
 a control system having a central processing unit (CPU), a display, digital storage and inputs enabling a user to set certain variables, such as distance between holes, the control system coupled by control lines to actuators providing movement of elements of the apparatus; and
 a furrow reference wheel contacting the soil surface in operation, the furrow reference wheel having actuators signaling the control system for distance traveled;
 wherein in operation with the apparatus towed over a planting bed at least partially covered with plastic sheeting, the burner elements in the operating units make holes linearly along a plurality of rows in the plastic sheeting at preset linear intervals.

2. The apparatus of claim 1 wherein the outboard sections are each coupled by pivot mechanisms operated by pressure cylinders that, activated, raise the outboard sections to narrow the apparatus for travel or storage.

3. The apparatus of claim 1 wherein the center section of the framework is carried on wheels mounted to arms coupled pivotally to the center section, wherein the arms locked in place carry the apparatus for transportation and storage.

4. The apparatus of claim 1 wherein each burner element is formed to make a hole of a specific size and shape, and the burner elements are manually replaceable in the insulators.

5. The apparatus of claim 1 wherein the sliding units are driven by hydraulic or electric actuators to reposition horizontally along the width of each framework section.

6. The apparatus of claim 1 wherein the power source is a rechargeable battery with a charging port.

7. The apparatus of claim 1 wherein the power source comprises an electric generator driven by an internal combustion engine.

8. The apparatus of claim 1 further comprising a clamp apparatus manually movable on each of the framework sections to align a center position for the sliding units.

9. The apparatus of claim 1 further comprising a source of compressed gas connected to pressure cylinders through remotely operable valves by which the cylinders are activated to extend and retract.

10. The apparatus of claim 1 further comprising a hydraulic pump and pressure tank connected to pressure cylinders through remotely operable valves by which the cylinders are activated to extend and retract.

11. A method for making holes in a plastic covering over a planting bed, comprising:
- towing an apparatus having a framework with a center section on wheels and two outboard sections on opposite sides coupled to the center section, by a hitch connector by tractor over a planting bed at least partially covered with plastic sheeting;
- trailing a plurality of carriages extending in the direction of travel and mounted by vertical pivots to the sliding units, the carriages each having an operating unit with supporting wheels at an end away from the framework mounted by a swivel allowing limited rotation horizontally, the operating units also each comprising vertical guides translated by pressure cylinders, the vertical guides each having an insulator and an electrically heated burner element adapted to make holes on contact with the plastic sheeting; and
- measuring linear translation along the planting bed by a furrow reference wheel mounted to the center frame, the furrow reference wheel sending distance measured to a control system programmed to trigger the pressure cylinders translating the vertical guides to extend the burner elements to contact the plastic sheeting and burn holes.

12. The method of claim 11 wherein the outboard sections are each coupled by pivot mechanisms operated by pressure cylinders that, activated, raise the outboard sections to narrow the apparatus for travel or storage, comprising activating the pressure cylinders, raising the outboard sections.

13. The method of claim 12 wherein the center section of the framework is carried on wheels mounted to arms coupled pivotally to the center section, comprising lowering the arms to support the apparatus on the wheels mounted to the arms with the outboard sections raised.

14. The method of claim 11 wherein each burner element is formed to make a hole of a specific size and shape, and the burner elements are manually replaceable in the insulators, comprising selecting burner elements of a specific size and shape for a particular planting bed, and mounting the selected burner elements to the insulators.

15. The method of claim 11 wherein the sliding units are driven by hydraulic actuators to reposition horizontally along the width of each framework section, comprising triggering the hydraulic actuators by the control system to move the sliding units to positions programmed into the control system.

16. The method of claim 11 wherein the apparatus has a battery power source for powering the burner elements, further comprising powering the burner elements by the battery in burning holes in the plastic sheeting covering the planting bed.

17. The method of claim 11 wherein the apparatus has an electrical generator driven by an internal combustion engine for powering the burner elements, further comprising powering the burner elements by the generator in burning holes in the plastic sheeting covering the planting bed.

18. The method of claim 11 wherein the apparatus has a clamp apparatus manually movable on each of the framework sections to align a center position for the sliding units, further comprising setting the clamp apparatus to align the center positions.

19. The method of claim 11 wherein the apparatus has a source of compressed gas connected to pressure cylinders through remotely operable valves by which the cylinders are activated to extend and retract, further comprising activating the pressure cylinders to operate from the source of compressed gas.

20. The method of claim 11 wherein the apparatus has a source of hydraulic fluid under pressure connected to pressure cylinders through remotely operable valves by which the cylinders are activated to extend and retract, further comprising activating the pressure cylinders to operate from the source of hydraulic fluid.

\* \* \* \* \*